(12) United States Patent
Zeng et al.

(10) Patent No.: US 11,038,211 B2
(45) Date of Patent: Jun. 15, 2021

(54) BATTERY PACK

(71) Applicant: Contemporary Amperex Technology Co., Limited, Ningde (CN)

(72) Inventors: Min Zeng, Ningde (CN); Yadong Jiang, Ningde (CN); Mu Qian, Ningde (CN); Zesheng He, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 16/674,327

(22) Filed: Nov. 5, 2019

(65) Prior Publication Data

US 2020/0153052 A1 May 14, 2020

(30) Foreign Application Priority Data

Nov. 9, 2018 (CN) .......................... 201821842354.0

(51) Int. Cl.
*H01M 10/42* (2006.01)
*H01H 9/04* (2006.01)
(Continued)

(52) U.S. Cl.
CPC .......... *H01M 10/4257* (2013.01); *H01H 1/14* (2013.01); *H01H 9/54* (2013.01); *H01M 2010/4271* (2013.01); *H01M 2200/00* (2013.01)

(58) Field of Classification Search
CPC ..... H01M 10/4257; H01M 2010/4271; H01M 2200/00; H01M 50/20; H01M 2200/103;
(Continued)

(56) References Cited

U.S. PATENT DOCUMENTS 2,419,072 A 4/1947 Hall
2,519,329 A 8/1950 Woodward
(Continued)

FOREIGN PATENT DOCUMENTS

CN 101442203 A 5/2009
CN 103879291 A 6/2014
(Continued)

OTHER PUBLICATIONS

The Extended European search report dated Feb. 3, 2020 for European application No. 19190652.8, 10 pages.
(Continued)

*Primary Examiner* — Milton I Cano
*Assistant Examiner* — Christian Roldan
(74) *Attorney, Agent, or Firm* — Law Offices of Liaoteng Wang

(57) ABSTRACT

The disclosure relates to a battery pack, comprising a casing; a built-in circuit disposed inside the casing; a consumable component disposed inside the casing and connected in series to the built-in circuit, wherein an opening corresponding to the consumable component is provided on the casing; a safety switch disposed inside the casing, wherein an on/off of the safety switch controls a connection/disconnection of the built-in circuit; and a cover body disposed corresponding to the opening, wherein the cover body has a first state in which the cover body is capped at the opening, so that the safety switch is switched on and the built-in circuit is connected, and a second state in which the cover body is detached from the opening, so that the safety switch is switched off and the built-in circuit is disconnected.

6 Claims, 6 Drawing Sheets

(51) Int. Cl.
  *H01H 9/22* (2006.01)
  *H01H 3/16* (2006.01)
  *H01H 13/18* (2006.01)
  *H01H 1/14* (2006.01)
  *H01H 9/54* (2006.01)

(58) Field of Classification Search
  CPC ............ H01H 1/14; H01H 9/54; H01H 9/045; H01H 9/226; H01H 1/20; H01H 3/161; H01H 13/183; Y02E 60/10
  USPC ............................................................ 429/7
  See application file for complete search history.

(56) References Cited

U.S. PATENT DOCUMENTS

| | | | |
|---|---|---|---|
| 4,982,058 A | | 1/1991 | Schroeder et al. |
| 7,704,099 B1 | | 4/2010 | Hong et al. |
| 2018/0113157 A1 | * | 4/2018 | Gross ................... B60L 3/04 |

FOREIGN PATENT DOCUMENTS

| | | | | |
|---|---|---|---|---|
| CN | 105957773 A | | 9/2016 | |
| CN | 205883187 U | | 1/2017 | |
| CN | 206060100 U | | 3/2017 | |
| CN | 206194817 U | | 5/2017 | |
| CN | 208000958 U | | 10/2018 | |
| CN | 209056522 U | | 7/2019 | |
| JP | 2016127769 A | | 7/2016 | |
| WO | WO-2014117711 A1 | * | 8/2014 | ............ H01H 37/76 |

OTHER PUBLICATIONS

PCT International Search Report for PCT/CN2019/115635, dated Feb. 11, 2020, 10 pages.

The examination report dated Jun. 17, 2020 for European application No. 19190652.8, 7 pages.

* cited by examiner

BATTERY PACK

CROSS-REFERENCE TO RELATED APPLICATION

This application is based on and claims priority to Chinese Patent Application No. 201821842354.0 filed on Nov. 9, 2018, which is incorporated herein by reference in its entirety.

TECHNICAL FIELD

The disclosure relates to the technical field of power battery device, in particular to a battery pack.

BACKGROUND

Nowadays, in various battery pack, a fuse is added into the built-in circuit to protect the safe operation of the circuit. When the current abnormally rises to a certain height and heat, the fuse blows and cuts off the current, so the fuse belongs to a consumable component that needs to be always maintained. If there is no separate maintenance window, the cover of the casing needs to be removed during maintenance. Since the number of bolts on the cover of the casing is generally as high as forty to fifty, the operation is troublesome and time-consuming during disassembly, and such operation easily causes a failure of the sealing interface of the upper and lower casings.

In prior art, in order to solve the above technical problem, one or more special maintenance windows are generally designed in the battery pack, and the consumable component such as the fuse of the battery pack is maintained from the window. However, this configuration brings about the following problems: firstly, if the maintenance personnel do not operate properly, for example, forget to disconnect the built-in circuit in the battery pack before repairing the consumable component such as fuse, it is easy to result in an electric shock; secondly, if the maintenance personnel forget to reinstall the maintenance cover after maintenance is completed, sealing function of the battery pack may be invalid, the high-voltage component such as the fuse may be exposed to the outside, as a result, the insulation protection is invalid, and it is likely to cause a high-voltage short-circuit once the battery pack encounters water or rain, thereby causing a safety accident such as a fire and explosion of the battery pack.

Therefore, there is a need for a novel battery pack.

SUMMARY

The embodiments of the disclosure provide a novel battery pack which is aimed at improving the safety performance of the battery pack.

In one aspect, an embodiment of the disclosure provides a battery pack including: a casing; a built-in circuit disposed inside the casing; a consumable component disposed inside the casing and connected in series to the built-in circuit, wherein an opening corresponding to the consumable component is provided on the casing; a safety switch disposed inside the casing, wherein an on/off of the safety switch controls a connection/disconnection of the built-in circuit; and a cover body disposed corresponding to the opening, wherein the cover body has a first state in which the cover body is capped at the opening, the safety switch is switched on, and the built-in circuit is connected, and a second state in which the cover body is detached from the opening, the safety switch is switched off, and the built-in circuit is disconnected.

According to an aspect of the disclosure, the safety switch includes a stationary contact and a movable contact, and the movable contact has a first position in which the movable contact is connected to the stationary contact and the safety switch is switched on, and a second position in which the movable contact is separated from the stationary contact and the safety switch is switched off; and the movable contact is disposed corresponding to the opening, so that the movable contact is driven to move from the second position to the first position when the cover body is moved from the second state to the first state.

According to an aspect of the disclosure, the movable contact is elastic such that the movable contact is moved between the first position and the second position by its own elastic force.

According to an aspect of the disclosure, the safety switch further includes a reset member, which is coupled to the movable contact such that movable contact is moved between the first position and the second position by a reset deformation of the reset member.

According to an aspect of the disclosure, one end of the reset member in a reset deformation direction thereof is coupled to the movable contact, and the other end is disposed corresponding to the opening, so that the cover body drives the movable contact to move by the reset member; or, one end of the reset member in the reset deformation direction thereof is coupled to a side of the movable contact facing away from the cover body, so that the cover body directly drives the movable contact to move.

According to an aspect of the disclosure, the number of the reset member is two, and the two reset members are a first reset member and a second reset member, respectively; and the movable contact has a first surface and a second surface which are disposed opposite to each other, one end of the first reset member in a reset deformation direction thereof is disposed corresponding to the opening, and the other end is coupled to the first surface, and one end of the second reset member in the reset deformation direction thereof is coupled to the second surface.

According to an aspect of the disclosure, the number of the stationary contact is two, and the two stationary contacts are spaced apart in a first direction; and the movable contact is extended in the first direction to be simultaneously connectable to the two stationary contacts.

According to an aspect of the disclosure, the safety switch further includes a control column, which is coupled to one end of the first reset member and disposed corresponding to the opening, and a contact surface of the control column adjacent to the cover body is a smooth surface.

According to an aspect of the disclosure, the safety switch further includes a housing including a bottom plate and an upper housing, the stationary contact and the second reset member are fixed to the bottom plate, the movable contact, the first reset member and the control column are sequentially arranged within the upper housing, and a through hole is provided on a side of the upper housing opposite to the bottom plate to enable the control column to be protruded out of the through hole.

According to an aspect of the disclosure, the battery pack further includes an accommodation space for accommodating the safety switch, and the accommodation space is in communication with the opening to enable the control column to be protruded out of the through hole.

According to an aspect of the disclosure, the safety switch includes two connectors, and a conductive layer is provided on an inner surface of the cover body, so that the two connectors are in communication through the conductive layer and the safety switch is switched on when the cover body is in the first state, and the two connectors are not in communication and the safety switch is switched off when the cover body is in the second state.

According to an aspect of the disclosure, the connectors are elastic; or the safety switch further includes two elastic members, and the two elastic members are disposed on the respective side of the two connectors away from the cover body such that the connectors are abutted against the cover body through elastic deformation of the elastic members.

According to an aspect of the disclosure, the safety switch is connected in series to the built-in circuit; or the battery pack further includes a control circuit, to which the safety switch is connected in series to control a connection/disconnection of the control circuit, and a controller, which is configured to control the built-in circuit to be connected when the control circuit is connected and to control the built-in circuit to be disconnected when the control circuit is disconnected.

In the embodiment of the disclosure, the built-in circuit and the consumable component connected in series with the built-in circuit are disposed inside the casing of the battery pack, and the opening corresponding to the consumable component is further disposed on the casing. With such configuration, it is convenient to repair the consumable component from the opening. Further, the battery pack includes the safety switch and the cover body, and the connection/disconnection of the built-in circuit can be controlled through the on/off of the safety switch. When the cover body is in the first state, that is, when the cover body is capped at the opening, the safety switch is switched on, the built-in circuit is connected, and therefore the battery pack can be normally used. When the cover body is in the second state, that is, when the cover body is detached from the opening, the safety switch is switched off, the built-in circuit is disconnected, and therefore the battery pack cannot be used normally. Therefore, in the embodiment of the disclosure, the battery pack can be used normally only when the cover body is capped at the opening and the battery pack is tightly sealed, and therefore, the safety accident caused by the seal failure when the battery pack is used can be avoided; and in this embodiment, the built-in circuit is disconnected when the cover body is detached from the opening, and therefore, the safety accident caused when the built-in circuit is forgotten to be disconnected during maintenance of the consumable component can be avoided.

BRIEF DESCRIPTION OF THE DRAWINGS

Other features, objects, and advantages of the disclosure will be apparent from the detailed description of non-restrictive embodiments with reference to the accompanying drawings, in which, the same or similar reference numerals indicate the same or similar features.

REFERENCE NUMERALS

Figure 1:
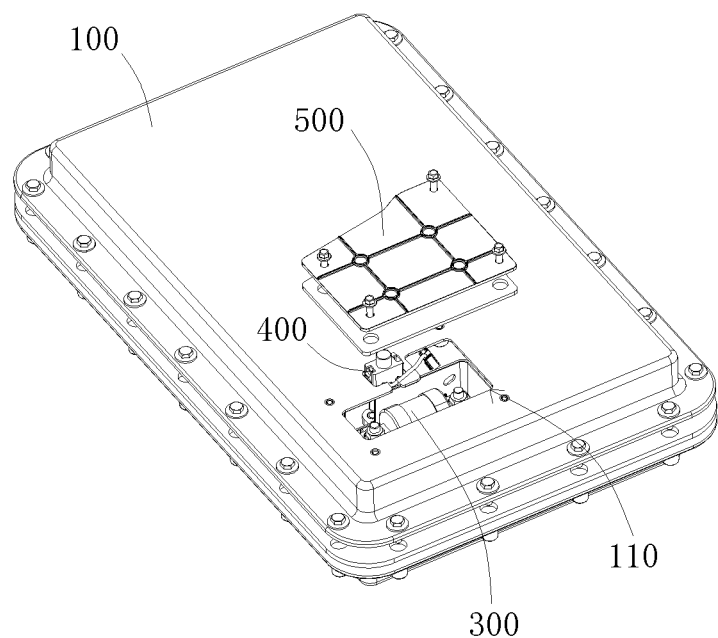
FIG. 1 is a schematic structural view of a battery pack according to an embodiment of the disclosure.

100 casing;
110 opening; 120 accommodation space;
200 built-in circuit; 210 relay;
300 consumable component;
400 safety switch;
410 stationary contact;
420 movable contact; 421 first surface; 422 second surface;
430 reset member; 431 first reset member; 432 second reset member;
440 control column;
450 housing; 451 bottom plate; 452 upper housing; 453 through hole; 454 hook member; 455 snap member;
460 connector;
500 cover body;
510 conductive layer;
600 controller;
610 control circuit.

DETAILED DESCRIPTION

Features and exemplary embodiments of various aspects of the disclosure are described in detail below. In the following detailed description, numerous specific details are set forth to provide comprehensive understanding of the disclosure. However, it will be apparent to the skilled in the art that the disclosure may be practiced without some of the specific details. The following description of the embodiments is merely to provide a better understanding of the disclosure. In the drawings and the following description, at least some of the known structures and techniques are not shown, to avoid unnecessarily obscuring the disclosure. Further, for clarity, the dimension of some of the structures may be enlarged. Furthermore, features, structures, or characteristics described hereinafter may be combined in any suitable manner in one or more embodiments.

The orientation terms appearing in the following description refer to the directions shown in the drawings, and are not intended to limit the specific structure in the embodiments of the disclosure. In the description of the disclosure, it should be noted that, unless otherwise stated, the term "mount" or "connect" is to be understood broadly, for example, it may be fixed connection or detachable connection or integral connection; or may be direct connection or indirect connection. The specific meaning of the above terms in the disclosure may be understood by the skilled in the art based on the specific situation.

In order for better understanding of the disclosure, the battery pack according to an embodiment of the disclosure will be described in detail below with reference to FIGS. 1 to 12.

Figure 2:
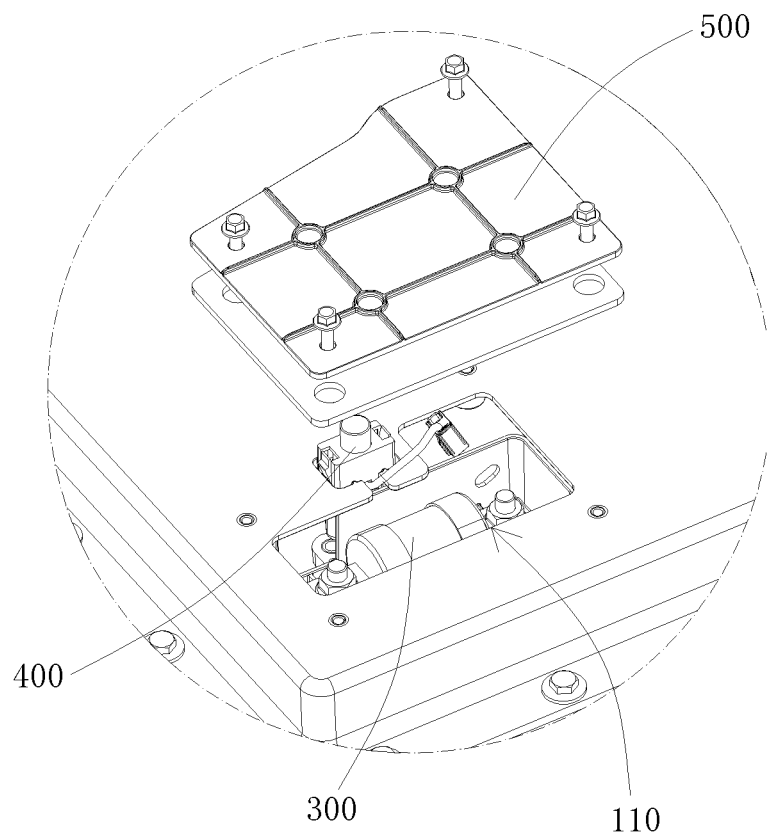
FIG. 2 is a schematic view showing the partial detail of FIG. 1.
Figure 3:
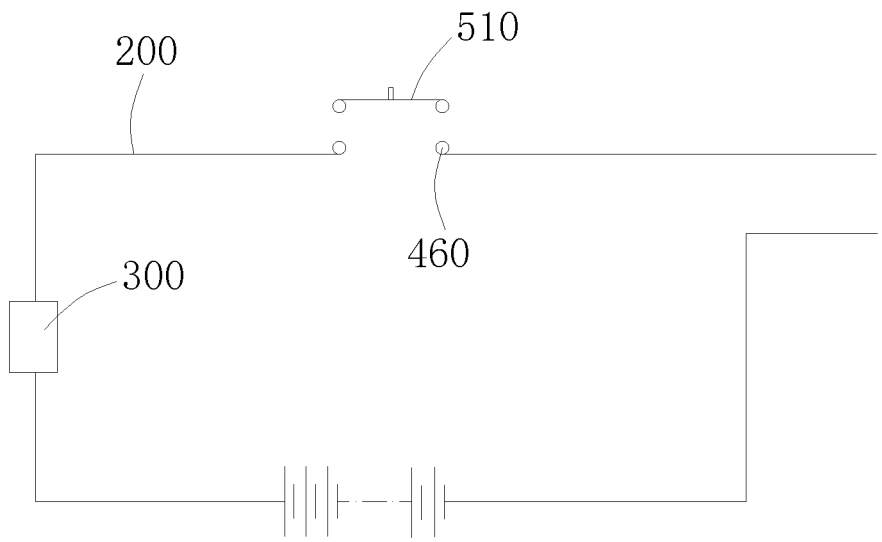
FIG. 3 is a schematic view of a circuit structure of a battery pack according to an embodiment of the disclosure.

FIG. 1 shows a battery pack according to an embodiment of the disclosure, FIG. 2 is a partial detail view of FIG. 1, and FIG. 3 is a schematic view of a circuit structure of a battery pack according to an embodiment of the disclosure. Referring to FIGS. 1 to 3, the battery pack includes a casing 100, a built-in circuit 200 disposed inside the casing 100, a consumable component 300 disposed inside the casing 100 and connected in series with the built-in circuit 200, wherein an opening 110 corresponding to the consumable component 300 is provided on the casing 100; a safety switch 400 disposed inside the casing 100, wherein the on/off of the safety switch 400 controls the connection/disconnection of the built-in circuit 200; a cover body 500 disposed corresponding to the opening 110, wherein the cover body 500 has a first state in which the cover body 500 is capped at the opening 110, the safety switch 400 is switched on, and the built-in circuit 200 is connected, and a second state in which the cover body 500 is detached from the opening 110, the safety switch 400 is switched off, and the built-in circuit 200 is disconnected.

The connection/disconnection of the built-in circuit 200 may be controlled through the on/off of the safety switch 400 in various manners. For example, the safety switch 400 is connected in series with the built-in circuit 200, and therefore, when the safety switch 400 is switched off, the built-in circuit 200 is disconnected, and when the switch 400 is switched on, the built-in circuit 200 is connected. On this account, the operation is simple, and the implementation is convenient.

Figure 4:
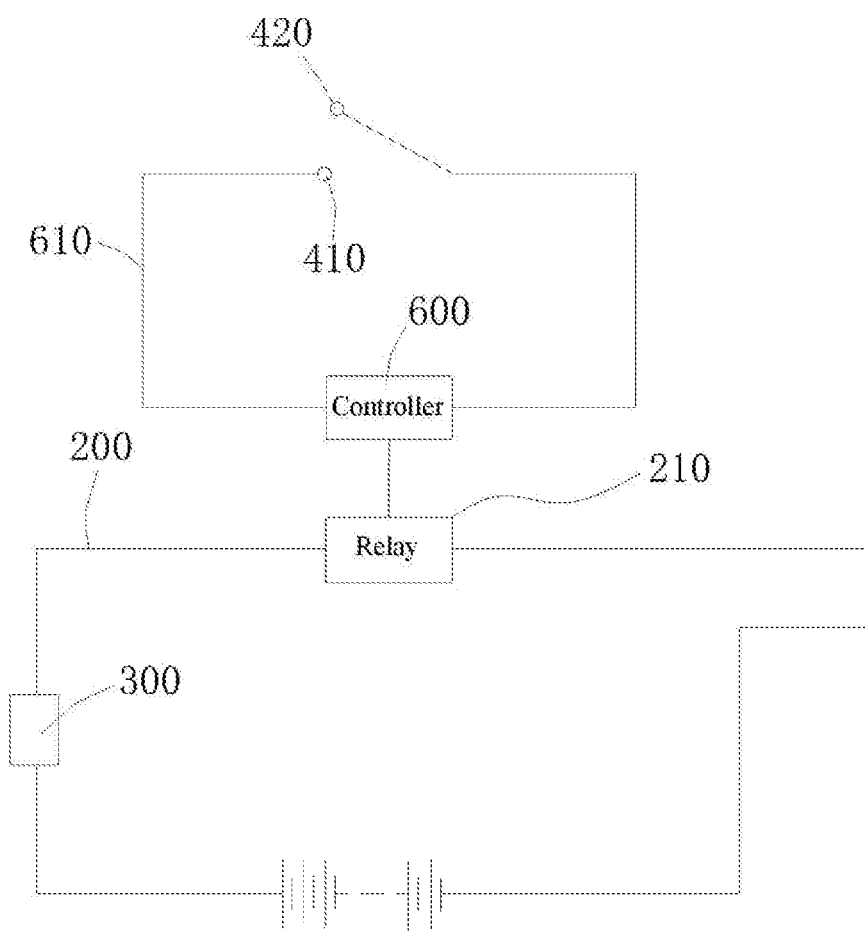
FIG. 4 is a schematic view of a circuit structure of a battery pack according to another embodiment of the disclosure.

Alternatively, as shown in FIG. 4, the battery pack further includes a control circuit 610 and a controller 600. The safety switch 400 is connected in series with the control circuit 610 to control the connection/disconnection of the control circuit 610. The controller 600 is configured to control the built-in circuit 200 to be connected when the control circuit 610 is connected, and to control the built-in circuit 200 to be disconnected when the control circuit 610 is disconnected. The connection/disconnection of the built-in circuit 200 may be controlled by the controller 600 in various manners. For example, as shown in FIG. 4, a relay 210 is provided in the built-in circuit 200, and the controller 600 controls the connection/disconnection of the built-in circuit 200 by controlling the on/off of the relay 210.

The manner of controlling the connection/disconnection of the built-in circuit 200 through the on/off of the safety switch 400 is not limited thereto, and will not be repeated here, as long as the built-in circuit 200 is connected when the safety switch 400 is switched on, and the built-in circuit is disconnected when the safety switch 400 is switched off.

The consumable component 300 may be a component that is easily damaged, such as a fuse in the battery pack. The built-in circuit 200 may be a power supply circuit within the battery pack.

In the embodiment of the disclosure, the built-in circuit 200 and the consumable component 300 connected in series with the built-in circuit 200 are disposed inside the casing 100 of the battery pack, and the opening 110 corresponding to the consumable component 300 is further provided in the casing 100. With such configuration, it is convenient to repair the consumable component 300 from the opening 110. Further, the battery pack includes the safety switch 400 and the cover body 500, and the connection/disconnection of the built-in circuit 200 can be controlled through the on/off of the safety switch 400. When the cover body 500 is in the first state, that is, when the cover body 500 is capped at the opening 110, the safety switch 400 is switched on, the built-in circuit 200 is connected, and therefore the battery pack can be normally used. When the cover body 500 is in the second state, that is, when the cover body 500 is detached from the opening 110, the safety switch 400 is switched off, the built-in circuit 200 is disconnected, and therefore the battery pack cannot be used normally. Therefore, in the embodiment of the disclosure, the battery pack can be used normally only when the cover body 500 is capped at the opening 110 and the battery pack is tightly sealed, and therefore, the safety accident caused by the seal failure when the battery pack is used can be avoided; and in this embodiment, the built-in circuit 200 is disconnected when the cover body 500 is detached from the opening 110, and therefore, the safety accident caused when the built-in circuit 200 is forgotten to be disconnected during maintenance of the consumable component 300 can be avoided.

It can be understood that, the on/off of the safety switch 400 may be implemented by setting the cover body 500 to be in the first state or the second state in various manners. As shown in FIG. 3, the safety switch 400 includes two connectors 460, and a conductive layer 510 is provided on the inner surface of the cover body 500. When the cover body 500 is in the first state, the cover body 500 is capped at the opening 110, and at this time, the two connectors 460 are in communication through the conductive layer 510, the safety switch 400 is switched on, and therefore the built-in circuit 200 is connected. When the cover body 500 is in the second state, the two connectors 460 are not in communication, the safety switch 400 is switched off, and therefore the built-in circuit 200 is disconnected. In this embodiment, the on/off of the safety switch 400 is controlled by providing the conductive layer 510 in the cover body 500. On this account, the implementation is simple and the operation is convenient.

In order to ensure the stability of the connection between the connectors 460 and the conductive layer 510 in the cover body 500, the connectors 460 are provided to be elastic. When the cover body 500 is capped at the opening 110, the connectors 460 are tightly abutted against the cover body 500 under the elastic force of the connectors 460, to ensure the stability of the connection between the connectors 460 and the cover body 500. Alternatively, the safety switch 400 further includes two elastic members (not shown), which are disposed on the respective side of the two connectors 460 away from the cover body 500. When the cover body 500 is capped at the opening 110, the connectors 460 are abutted against the cover body 500 by elastic deformation of the elastic members.

In these alternative embodiments, when the cover body 500 is capped at the opening 110, the elastic deformation of the elastic members causes the connectors 460 to abut against the conductive layer 510 of the cover body 500, and under the action of the elastic members, the relative position between the connectors 460 and the cover body 500 is more stable. Therefore, the connection between the connectors 460 and the conductive layer 510 is not affected even if the battery pack is subjected to an impact or the like, and thereby the stability of the operation of the battery pack is ensured.

Further, in order to ensure that the elastic members play a full effect, the connectors 460 is disposed to be protruded out of the opening 110 under the action of the elastic members when the cover body 500 is in the second state, and to be abutted against the cover body 500 when the cover body 500 is in the first state.

The elastic members may be provided in various ways, for example, the elastic members are springs, resilient pieces, or the like. The elastic members may be coupled to the connectors 460 by welding or the like.

Figure 5:
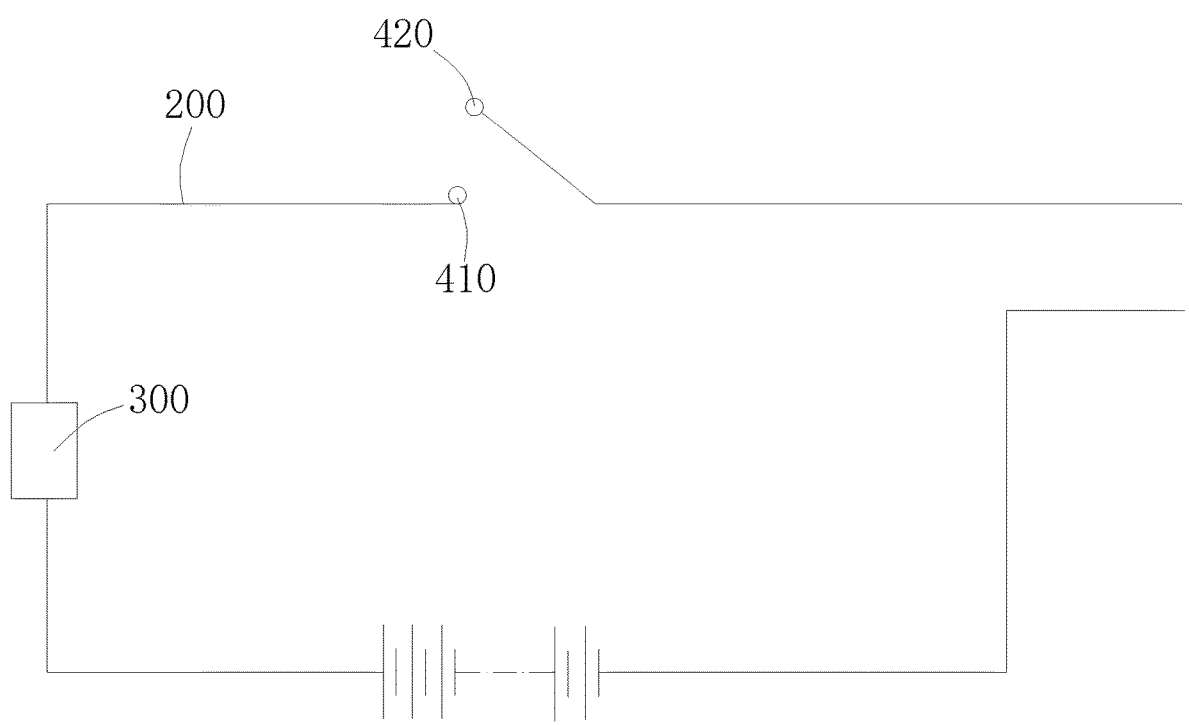
FIG. 5 is a schematic view of a circuit structure of a battery pack according to still another embodiment of the disclosure.

As shown in FIGS. 4 and 5, in still other alternative embodiments, the safety switch 400 includes a stationary contact 410 and a movable contact 420, wherein the movable contact 420 has a first position in which the movable contact 420 is connected to the stationary contact 410 and the safety switch 400 is switched on, and a second position in which the movable contact 420 is separated from the stationary contact 410 and the safety switch 400 is switched off. The movable contact 420 is disposed corresponding to the opening 110, so that the movable contact 420 is moved from the second position to the first position when the cover body 500 is moved from the second state to the first state.

In these alternative embodiments, the cover body 500 does not have a conductive function, and the cover body 500 is only used as a driving member that drives the movable contact 420 and the stationary contact 410 to contact each other. When the cover body 500 is capped at the opening 110, the cover body 500 is in contact with the movable contact 420, and the movable contact 420 is in contact with the stationary contact 410 under the action of the cover body 500, so that the safety switch 400 is switched on. When the cover body 500 is detached from the opening 110, the movable contact 420 is popped open, the movable contact 420 and the stationary contact 410 are separated from each other, so that the safety switch 400 is switched off.

The movable contact 420 may be moved between the first position and the second position in various manners. For example, the movable contact 420 may be elastic, and the movable contact 420 moves between the first position and the second position under its own elastic force. The movable contact 420 having elasticity may be a resilient piece, a spring, or the like, which is not limited hereto, as long as the movable contact 420 is elastic and electrically conductive.

Alternatively, the safety switch 400 further includes a reset member 430, which is coupled to the movable contact 420 to move the movable contact 420 between the first position and the second position by a reset deformation of the reset member 430.

In these alternative embodiments, the movable contact 420 is moved between the first position and the second position not by its own elastic force but by the reset deformation of the reset member 430. In this regard, the movable contact 420 does not need to be deformed, and thus the loss of the movable contact 420 can be reduced, and the service life of the movable contact 420 can be improved.

The relative position of the reset member 430 and the movable contact 420 is not limited hereto. For example, the reset member 430 is disposed on a side of the movable contact 420 adjacent to the cover body 500, and when the cover body 500 is moved from the second state to the first state, the cover body 500 can drive the reset member 430 to undergo a reset deformation, so that the movable contact 420 connected to the reset member 430 is moved from the second position to the first position. Alternatively, one end of the reset member 430 is connected to a side of the movable contact 420 facing away from the cover body 500 such that the movable contact 420 is directly abutted against the cover body 500, so when the cover body 500 is moved from the second state to the first state, the cover body 500 can directly drive the movable contact 420 to make the reset member 430 undergo the reset deformation, so that the movable contact 420 is moved from the second position to the first position. The reset member 430 may be provided in various ways, for example, the reset member 430 is a spring, a resilient piece or the like. The reset member 430 may be coupled to the movable contact 420 by welding or the like.

The number of the reset members 430 is not limited hereto, and the reset member 430 may be one or two or more.

Figure 6:
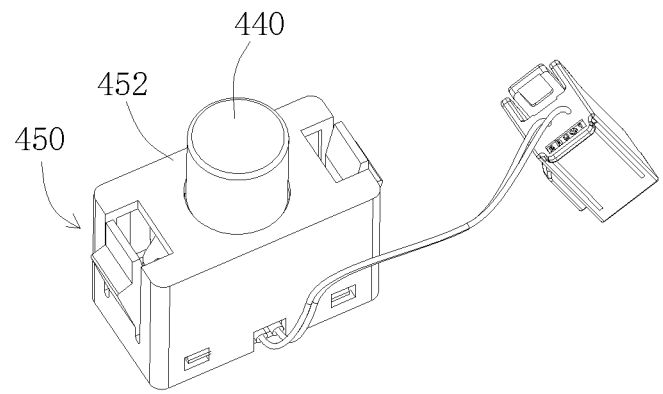
FIG. 6 is a perspective view of a safety switch of a battery pack according to an embodiment of the disclosure.
Figure 7:
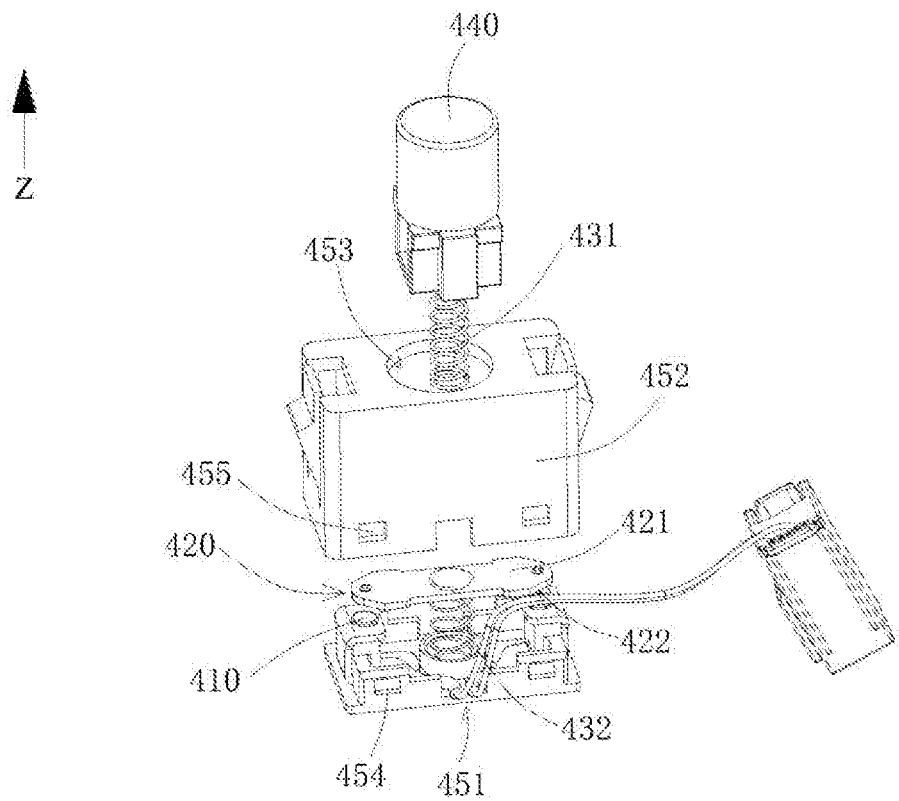
FIG. 7 is a schematic exploded view of a safety switch of a battery pack according to an embodiment of the disclosure.

As shown in FIGS. 6 and 7, in some alternative embodiments, the number of the reset members 430 is two, and the two reset members 430 are respectively disposed on two sides of the movable contact 420, and the two reset members 430 are respectively a first reset member 431 and a second reset member 432. The movable contact 420 has a first surface 421 and a second surface 422 which are disposed opposite to each other. One end of the first reset member 431 in a reset deformation direction thereof is disposed corresponding to the opening 110, and the other end is coupled to the first surface 421, and one end of the second reset member 432 in the reset deformation direction thereof is coupled to the second surface 422.

In these alternative embodiments, since the number of the reset members 430 is two, the distance of reset deformation of the two reset members 430 is longer, so that the movable contact 420 can move a longer distance. Further, since the movable contact 420 is abutted against the cover body 500 via the first reset member 431, wear caused when the movable contact 420 is abutted directly against the cover body 500 can be avoided, and the service life of the movable contact 420 can be improved. In use, the other end of the second reset member 432 may be fixed to the object, so the movable contact 420 can be elastically fixed by the second reset member 432, thereby ensuring that the movable contact 420 moves along a predetermined path.

In any of the above embodiments, the number of the movable contact 420 and the stationary contact 410 is not limited hereto. For example, the number of either of the movable contact 420 and the stationary contact 410 may be one. Alternatively, the number of the stationary contacts 410 may be two, and the two stationary contacts 410 are respectively connected with the built-in circuit 200. When the movable contact 420 is moved from the second position to the first position, the movable contact 420 can be simultaneously connected to the two stationary contacts 410, so that the two stationary contacts 410 are in communication by the movable contact 420, the safety switch 400 is switched on, and the built-in circuit 200 is connected.

As shown in FIG. 7, the two stationary contacts 410 are spaced apart in a first direction, and the movable contact 420 is extended in the first direction, so that the movable contact 420 can be simultaneously connected to the two stationary contacts 410.

In some alternative embodiments, the safety switch 400 further includes a control column 440, which is disposed at one end of the first reset member 431 away from the movable contact 420. When the cover body 500 is capped at the opening 110, the cover body 500 is abutted against the control column 440, so wear between the cover body 500 and the first reset member 431 can be avoided, and meanwhile, the shape of the control column 440 may be changed according to actual needs, thereby attenuating the wear of the cover body 500 caused by the control column 440. For example, the control column 440 is cylindrical or the top end of the control column 440 is spherical, so that the contact surface of the control column 440 and the cover body 500 is a smooth surface, thereby alleviating the wear of the cover body 500 caused when the cover body 500 and the control column 440 are contacted with each other.

The safety switch 400 further includes a housing 450, inside which the stationary contact 410, the movable contact 420 and the reset member 430 described above are disposed. By providing the housing 450, it is possible to protect other components of the safety switch 400 in the casing 100 from environmental influence, and to ensure normal operation of other components of the safety switch 400.

Figure 8:
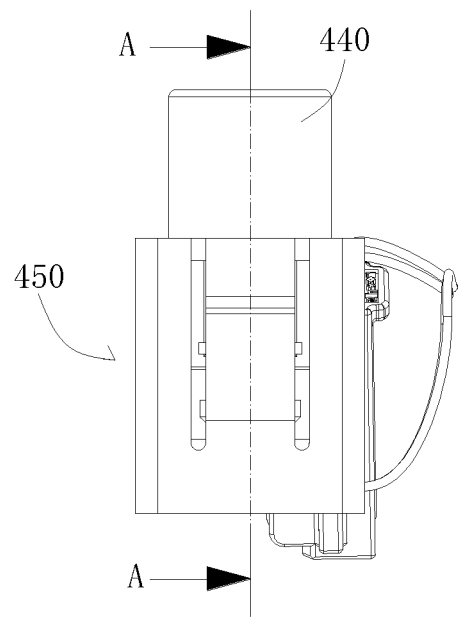
FIG. 8 is a side view of a safety switch of a battery pack according to an embodiment of the disclosure.
Figure 9:
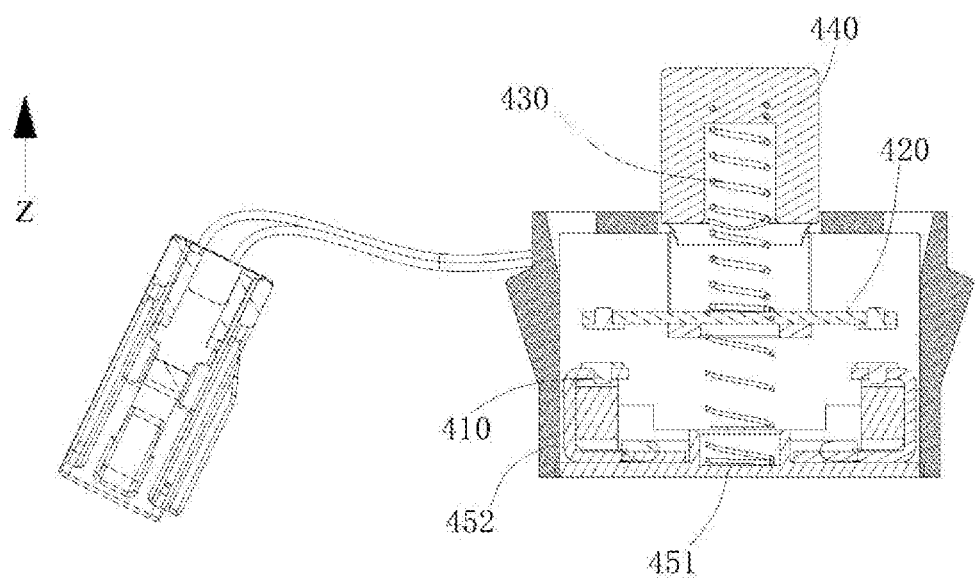
FIG. 9 is a cross-sectional view taken along line A-A of FIG. 8.

The housing 450 may be disposed in various manners. Referring to FIGS. 8 and 9, the housing 450 includes a bottom plate 451 to which the stationary contact 410 is fixed and an upper housing 452 to which the other end of the second reset member 432 is fixed. The upper housing 452 extends a predetermined distance along the Z direction in the figures, and a through hole 453 is provided on the top of the upper housing 452. The second reset member 432, the movable contact 420, the first reset member 431 and the control column 440 are sequentially arranged within the casing 100 from bottom to top. The control column 440 protrudes out of the through hole 453, and the control column 440 is movable within the through hole 453. Therefore, when the cover body 500 is capped at the opening 110, the control column 440 moves downward under the pressure of the cover body 500, and the movable contact 420 moves downward and contacts the stationary contact 410, thereby causing the safety switch 400 to be switched on. When the cover body 500 is detached from the opening 110, under the resetting force of the first reset member 431 and the second reset member 432, the movable contact 420 moves upward and is separated from the stationary contact 410, thereby causing the safety switch 400 to be switched off.

The shape of the housing 450 is not limited hereto. For example, the housing 450 may be prismatic or cylindrical, as long as the housing 450 can protect the stationary contact 410, the movable contact 420 and the reset member 430 in the safety switch 400.

The connection between the bottom plate 451 and the upper housing 452 is not limited hereto. For example, a hook member 454 is provided on one of the bottom plate 451 and the upper housing 452, and a snap member 455 is provided on the other of the bottom plate 451 and the upper housing 452. Through mutual engagement between the snap member 455 and the hook member 454, the upper housing 452 may be detachably coupled to the bottom plate 451.

Figure 10:
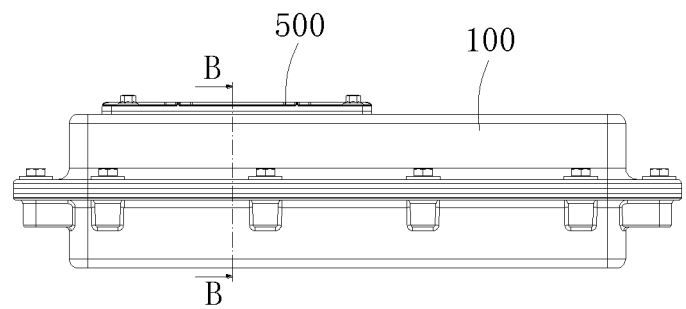
FIG. 10 is a side view of a battery pack according to an embodiment of the disclosure.
Figure 11:
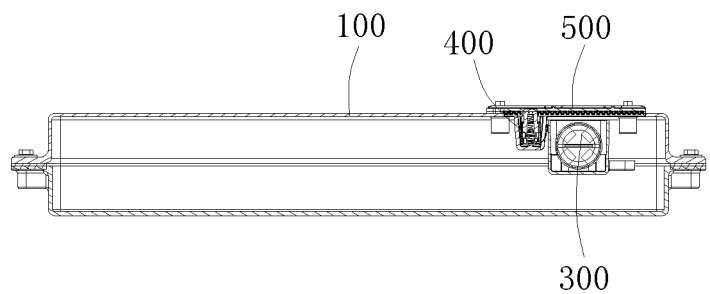
FIG. 11 is a cross-sectional view taken along line B-B of FIG. 10.
Figure 12:
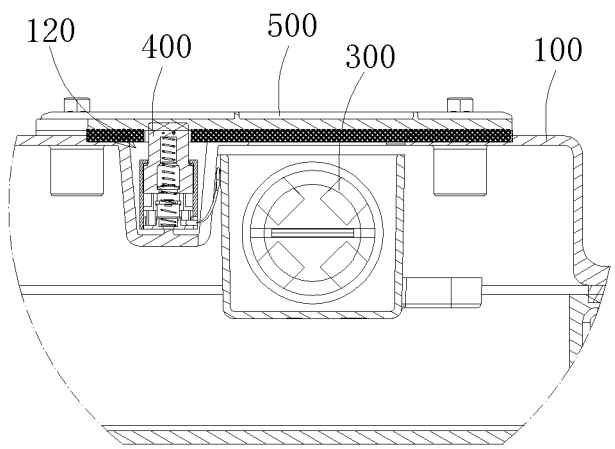
FIG. 12 is a schematic view showing the partial detail of FIG. 11.

When the safety switch 400 described above is disposed in the battery pack, as shown in FIGS. 10 to 12, the battery pack is further provided with an accommodation space 120 for accommodating the safety switch 400. The accommodation space 120 is in communication with the opening 110 such that the control column 440 can protrude out of the opening 110. Therefore, when the cover body 500 is capped at the opening 110, the cover body 500 is abutted against the control column 440, and the reset member 430 is contracted and deformed under the pressure of the cover body 500, so that the movable contact 420 is connected to the stationary contact 410. When the cover body 500 is detached from the opening 110, the reset member 430 is elongated due to the reset deformation, the movable contact 420 is separated from the stationary contact 410, and the safety switch 400 is switched off.

The disclosure may be embodied in other specific forms without departing from the spirit and essential characteristics thereof. For example, the algorithms described in the specific embodiments may be modified, and the system architecture does not depart from the basic spirit of the disclosure. The above embodiments are to be considered in all respects as illustrative and not restrict. The scope of the disclosure is defined by the appended claims rather than the foregoing description, and all modifications within the scope of the claims and equivalents are intended to be included within the scope of the disclosure.

What is claimed is:

1. A battery pack, comprising:
a casing;
a circuit disposed inside the casing;
a fuse disposed inside the casing and connected in series to the circuit, wherein an opening corresponding to the fuse is provided on the casing;
a switch disposed inside the casing, wherein the switch is connected in series with the circuit to control a connection/disconnection of the circuit; and
a cover body disposed corresponding to the opening, wherein the cover body is configured to have a first state in which the switch is switched on to connect the circuit when the cover body is capped at the opening and a second state in which the switch is switched off to disconnect the circuit when the cover body is detached from the opening, wherein,
the switch comprises a stationary contact, a movable contact capable of contacting the stationary contact under a driving action from the cover body, and a reset member coupled to the movable contact such that the movable contact is moved by a reset deformation of the reset member between a first position in which the movable contact is connected to the stationary contact to switch on the switch and a second position in which the movable contact is separated from the stationary contact to switch off the switch,
a number of the reset member is two, the two reset members are respectively disposed on two sides of the movable contact, and the two reset members are a first reset member and a second reset member, respectively;
the movable contact has a first surface and a second surface which are disposed opposite to each other, one end of the first reset member in a reset deformation direction thereof is disposed corresponding to the opening, and the other end is coupled to the first surface, and one end of the second reset member in the reset deformation direction thereof is coupled to the second surface;
the switch further comprises a control column, which is coupled to one end of the first reset member and disposed corresponding to the opening, and a contact surface of the control column adjacent to the cover body is a smooth surface; and
the switch further comprises a housing including a bottom plate and an upper housing, the stationary contact and the second reset member are fixed to the bottom plate, the movable contact, the first reset member and the control column are sequentially arranged within the upper housing, and a through hole is provided on a side of the upper housing opposite to the bottom plate to enable the control column to be protruded out of the through hole.

2. The battery pack according to claim 1, wherein the movable contact is disposed corresponding to the opening, so that the movable contact is driven to move from the second position to the first position when the cover body is moved from the second state to the first state.

3. The battery pack according to claim 2, wherein the movable contact is elastic such that the movable contact is moved between the first position and the second position by its own elastic force.

4. The battery pack according to claim 1, wherein
one end of the reset member in a reset deformation direction thereof is coupled to the movable contact, and the other end is disposed corresponding to the opening, so that the cover body drives the movable contact to move by the reset member; or
one end of the reset member in the reset deformation direction thereof is coupled to a side of the movable contact facing away from the cover body, so that the cover body directly drives the movable contact to move.

5. The battery pack according to claim 1, wherein
a number of the stationary contact is two, and the two stationary contacts are spaced apart in a first direction; and
the movable contact is extended in the first direction to be simultaneously connectable to the two stationary contacts.

6. The battery pack according to claim 1, wherein the battery pack further comprises an accommodation space for accommodating the switch, and the accommodation space is in communication with the opening to enable the control column to be protruded out of the opening.

\* \* \* \* \*